Figure 1:
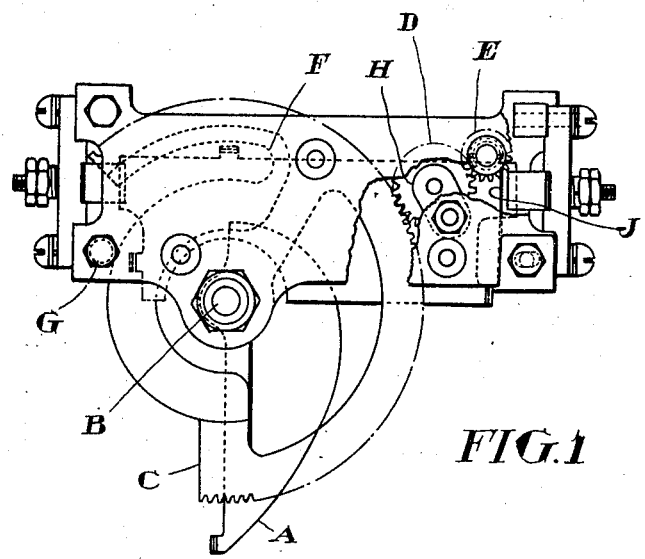

Nov. 9, 1926.

H. E. MOTT ET AL 1,606,660

ELECTRICAL CONDENSER

Filed Nov. 20, 1925

INVENTORS
HAROLD.E.MOTT
JEAN.P.MAURER
BY
ATTORNEYS

Patented Nov. 9, 1926.

1,606,660

UNITED STATES PATENT OFFICE.

HAROLD EDGAR MOTT AND JEAN PIERRE MAURER, OF MONTREAL, CANADA.

ELECTRICAL CONDENSER.

Application filed November 20, 1925. Serial No. 70,353.

This invention covers improvements in adjustable condensers for radio reception, and has for its object the provision of a variable low loss condenser having improved means for easy and positive adjustment. The condenser has a straight line frequency characteristic, i. e., the movement of the adjustable rotating portion of the condenser is directly proportional to the different signal frequencies it is desired to receive when the condenser is incorporated in a suitable radio reception circuit.

The condenser consists of two sets of plates, one set being fixed within a rigid framework, the other set being fastened to a shaft so placed that the two sets of plates alternately interleave. By rotation of the shaft through an angle of 180° the area of the rotating plates overlapping the fixed plates may be varied between zero and maximum.

The stator is made up of hard drawn brass plates, separated from one another and supported by slots cut into brass posts which are forced over extensions on the plates making a press fit and rigid assembly. At the front of either end and at the back of each stator plate a small lug is bent up so as to come in contact with the plate next to it. These lugs are soldered to one another at their points of contact, and the object is not only to make the stator assembly rugged, but also to reduce series resistance losses.

In order that the only variation of capacity may be between the rotor and stator plates the former is made with one less plate than the latter so as to avoid having a rotor plate between the frame and the stator which would cause variation of the otherwise fixed inherent capacity of the assembly, which is in parallel with the variable capacity. This is very important owing to the particular shape of the rotor plates. The rotor plates are so shaped that when the condenser is connected to a suitable inductance to form an oscillatory circuit the variation in natural frequency of this circuit, as obtained by varying the angular position of the rotor relative to the stator, is directly proportional to this angular variation of rotor position.

The rotor plates are preferably of hard drawn brass, separated from one another and supported by slots cut into two sides of a brass hub of circular section which is forced over two extensions of the plates equally spaced at either side of the rotor axis, to make a press fit. At the point of greatest radius of each rotor plate is a small lug which is bent up so as to come in contact with the lug on the plate next to it. These lugs are soldered to one another as in the case of the stator, in order to make the assembly rigid. The rotor plates are also soldered to the hub. The rotor hub is pressed over the main condenser shaft and fastened to it by a pin.

In order to reduce series resistance losses and to avoid noises due to rubbing contacts, connection is made to the rotor hub by means of a pigtail which takes two turns about the rotor and is soldered to a terminal stud at the back end plate. Means are provided for driving the condenser by a slow motion action.

Figure 2:
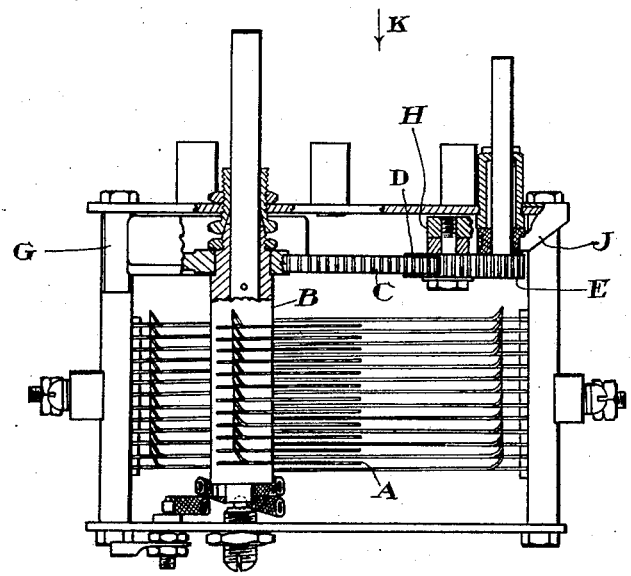

The construction of the condenser can best be understood by referring to the drawings Figure 1 is a part sectional elevation in the direction of the arrow K Figure 2.

Figure 2 is a sectional plan view of the condenser.

In Figure 1, A represents the plates of the rotor attached to the shaft B, to which is also attached the main gear wheel C which intermeshes with idler D, the latter gearing with a pinion E, thus rotation of the pinion E causes the wheel C to turn in the same direction, and hence the adjustment of the rotating plates is in the same direction as the movement of the pinion. A slot F is cut out of the wheel C in such a way that it will pass over one of the rods G of the condenser frame, the end of this slot forming a stop to the rotation when the plates have been rotated to the full 180°. The portion of the wheel outside this slot also acts as a balance weight to the rotating plates tending towards smooth rotation, hence easy adjustment and also ensuring that the rotor will remain at the point of adjustment without danger of shifting due to gravity or vibration. The centre of the idler D is placed upon a movable link H thus permitting it to move and adjust itself to any irregularities of the toothed surface of the wheel C, while pinion E is held against the idler D by means of a spring J shown in Figure 2. The shaft is allowed considerable play in the bearing at the pinion end in order that it may take up any irregularities of the idler, the spring keeping the pinion firmly intermeshed with the idler at all times.

Having now particularly described and ascertained the nature of the said invention, what we claim is:

1. A control mechanism for a condenser having a straight line frequency characteristic, consisting of a main gear wheel, an idler of smaller diameter supported upon a pivoted link intermeshed therewith, a pinion of smaller diameter than the idler intermeshed with it, and a spring for keeping the pinion meshed with the idler.

2. The combination with a variable plate condenser including a frame, a shaft mounted in the frame adapted to carry the rotor plates of the condenser and a rod forming part of said frame and located above said shaft, of a main segmental gear wheel fixed to said shaft and provided with a slot adapted to receive said bar therein and having its inner end closed to form a stop engageable with said bar, the portion of the wheel outside of said slot serving as a balance weight to insure smooth rotation of the shaft and the rotor plates carried thereby, and a drive gear meshing with said segmental gear wheel for imparting movement thereto.

In witness whereof, we have hereunto set our hands.

HAROLD EDGAR MOTT.
JEAN PIERRE MAURER.